United States Patent Office 3,318,914
Patented May 9, 1967

---

3,318,914
2,6-DIESTERS OF ASCORBIC ACID AND PROCESS FOR PRODUCING THE SAME
Kanjiro Kobayashi, Nishinomiya, Shigenori Iino, Setagaya-ku, Tokyo, and Haruyasu Ohta, Suginami-ku, Tokyo, Japan, assignors to Nihon Surfactant Industries Co., Ltd., Tokyo, Japan, a corporation of Japan
No Drawing. Filed Nov. 21, 1963, Ser. No. 325,460
Claims priority, application Japan, Nov. 26, 1962, 37/51,943
10 Claims. (Cl. 260—343.7)

This invention relates to new 2,6-diesters of ascorbic acid and isoascorbic acid and processes for producing the same.

More particularly, the present invention relates to 2,6-diesters of ascorbic acid (I) and isoascorbic acid (II) represented by the following general formulas:

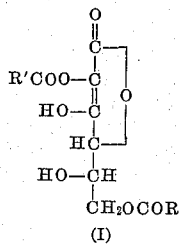   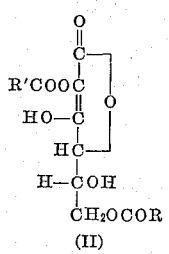
(I)                     (II)

wherein R, R' are members of the group consisting of aliphatic radicals having from 3 to 17 carbon atoms, said radicals being derived from aliphatic carboxylic acids, and aromatic radicals derived from aromatic carboxylic acids.

Further, the present invention relates to a proces for producing 2,6-diesters of ascorbic acid or isoascorbic acid comprising reacting an organic acid halide with a member selected from a group consisting of ascorbic acid, isoascorbic acid and their 6-monoesters, in the presence of a basic acid binder by using as a solvent an N,N-di-substituted amide represented by the general formula

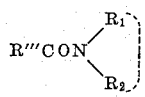

wherein R''' stands for hydrogen or a lower alkyl radical, particularly the methyl radical, and $R_1$ and $R_2$ stand for lower alkyl radicals, particularly the methyl radical, or piperidyl, pyrrolidyl or morpholyl radicals together with N. According to this process, 2,6-diesters of ascorbic acid or isoascorbic acid of a high purity and stability against oxidation can be obtained by a simple operation.

The reactions in the process of the present invention as represented by formulas in the case of ascorbic acid and its 6-monoesters are as follows:

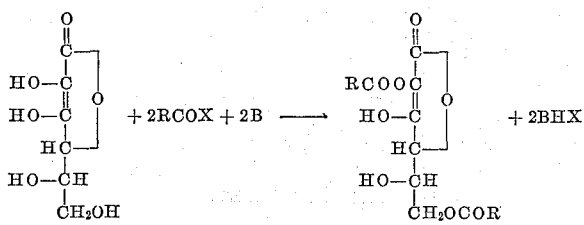

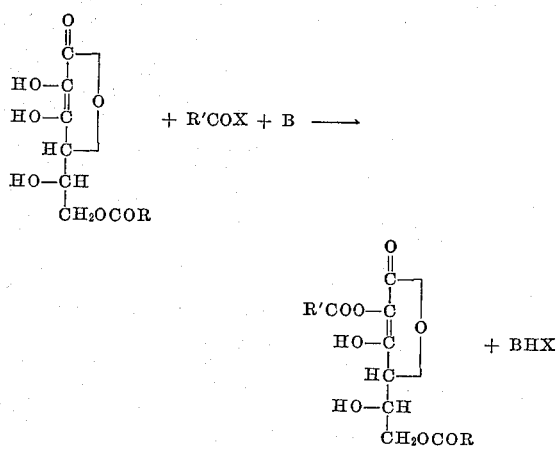

wherein R and R' stand for aliphatic or aromatic radicals and may be the same or different radicals, X stands for chlorine or bromine and B stands for a basic acid binder.

The following esters of ascorbic acid have already been reported: aliphatic carboxylic acid esters (in Oil and Soap, 1943, 224, by D. Swern et al., The Journal of Organic Chemistry, 1948, 613, by Martha Creighton et al. and U.S. Patents Nos. 2,454,747 to 2,454,749), aromatic carboxylic acid esters (in U.S. Patent No. 2,150,140 and German Patent No. 701,561), carbonic acid esters (in U.S. Patent No. 2,980,702) and some others in a considerable number. Especially a higher fatty acid 6-monoester is widely used as a physiologically harmless antioxidant. It is a known fact that such esters have a vitamin C activity in living bodies. As there are four esterifiable hydroxyl radicals in the ascorbic acid molecule, various esters will be produced according to esterification conditions. However, according to our findings, where it is attempted to partially esterify one or two of the four hydroxyl radicals by making one or two moles of a carboxylic acid halide or its anhydride react by using a heteroaromatic tertiary amine, such as pyridine, or an aliphatic tertiary amine of the type generally used as a basic acid binder, a mixture of several esters will usually be obtained. It is difficult to separate a single ester from the mixture. Especially, in fact, it is very difficult to partially esterify hydroxyl radicals in only two specific positions. Further, the higher fatty acid 6-monoester referred to above is produced by a sulfuric acid process. It is monoesterified in the 6-position but is not esterified in the enediol part in the 2,3-positions. Therefore, though it seems adequate as an antioxidant, in cease it is considered as a vitamin C source, its stability against oxidation in handling can never be said to be satisfactory.

As a result of investigating a process for simply synthesizing an ester which is stable against oxidation and is advantageous in use specifically as a vitamin C source for living bodies, we have discovered that, where an N,N-di-substituted amide having the general formula mentioned above is used as a solvent, even if such a basic acid binder as pyridine is used, not only ascorbic acid but also isoascorbic acid can be easily selectively diesterified in the 2,6-positions. According to the present process, such extremely troublesome operations as removing the unreacted fatty acid from the reaction product as are encountered in the production of higher fatty acid 6-monoesters by the sulfuric acid process are not required, the product is not likely to be colored and the operation is very simple. Therefore, our 2,6-diesters of ascorbic acid and isoascorbic acid are new compounds and they can be easily prepared by our new process.

As the N,N-di-substituted amides having the general formula mentioned above which are especially useful as a solvent, in this invention, there can be enumerated, for example, N,N-dimethyl acetamide, N,N-dimethyl formamide, and morpholine, pyrrolidine and piperidine having such lower acyl radicals as butylyl, propionyl, acetyl and formyl radicals connected to the nitrogen. As the basic acid binder there can be used such heteroaromatic tertiary amines as, for example, pyridine or quinoline. Especially, pyridine is most generally useful. As the organic carboxylic acid halide to be used in the present invention, there can be used a chloride or bromide of such aromatic carboxylic acids as, for example, benzoic acid or benzoic acid having any substituent on the benzene nucleus or an aliphatic carboxylic acid having from 4 to 18 carbon atoms.

As described above, as the starting material there can be used not only ascorbic acid and isoascorbic acid but also 6-monoesters thereof, such as a 6-monoester of an aliphatic or aromatic carboxylic acid.

In the present invention, as general reaction conditions, 1 mol of ascorbic acid, isoascorbic acid or a 6-monoester thereof is dissolved in an amount 5 to 10 times as large by weight of an N,N-di-substituted amide of the type mentioned above, 1.1 to 4 mols (a little excess of the theoretical amount) of a basic acid binder are added to the soution and 1 to 2.2 mols (or 0.5 to 1.1 mols when the starting material is the 6-monoester) of a carboxylic acid halide are dropped into the solution, while it is being stirred, at a temperature 20 to 50 degrees C. over a 30 minute to 1 hour period and then the solution is further stirred at the same temperature for several hours or is allowed to stand overnight at room temperature to complete the reaction. Then the excess solvent and basic acid binder remaining are distilled off under a reduced pressure. A solvent in which the diester is at best only slightly soluble, such as water or methanol, is added to the residue to precipitate the 2,6-diester product. The product is purified by such ordinary operations as extraction or recrystallization. The product obtained will not be substantally colored. In case the diester is a crystal, a product of high purity will be obtained by one recrystallization. Therefore, such troublesome purification operations as are required in the conventional sulfuric acid process are not required in the present process. It is advantageous to carry out the process of the present invention in as anhydrous a state as possible. Therefore, in carrying out the process, care should be taken to dry the raw materials, the solvent and the apparatus. Further, an advantage of the present process is that the distilled and recovered mixture of the solvent and the basic acid binder can be repeatedly used. It will be necessary to determine the amount of the basic acid binder recovered and add additional binder to make up for what has been used. Thus, the production cost can be thereby reduced. In case the raw material is a 6-monoester of ascorbic acid or isoascorbic acid, it will be possible to produce a mixed diester.

The 2,6-diesters of ascorbic acid or isoascorbic acid obtained by the present invention are new compounds containing no isomer esters as impurities. When the carboxylic acid part of the 2,6-diester consists of a lower fatty acid, the diester will be oily or hard to crystallize at room temperature. Otherwise it will be a colorless crystal hardly soluble or insoluble in water and soluble in organic solvents. Especially, the higher fatty acid diesters have the proper fat-solubility. When a solution of ferric chloride is added to an alcohol solution of the diester of the present invention, the solution will not be decolored but will soon become dark reddish brown. It does not decolor an alcohol solution of iodine at all. It shows blue in the test with chloranil and a tetra base, has no reducing property, is high in stability against oxidation and has heat stability. Even if it is exposed to diffused light in a room for a long time, it will not become yellow.

The diester of the present invention has a relatively strong acidity and can be titrated with a caustic alkali in an alcohol solution. As determined by periodic acid titration, there are no two adjacent hydroxyl radicals in its molecule. Further, the ultraviolet absorption spectrum in an alcohol solution shows a $\lambda_{max.}$ of 226 to 228 m$\mu$ and a $\lambda_{max.}$ of 256 m$\mu$ in alkaline medium which are identical respectively with a $\lambda_{max.}$ of 227 m$\mu$ and a $\lambda_{max.}$ of 256 m$\mu$ in alkaline medium of the known 2,5,6-tricarboethoxy ascorbic acid, but the diester of the invention is not identical with a $\lambda_{max.}$ of 257 m$\mu$ and a $\lambda_{max.}$ of 257 m$\mu$ in alkaline medium of the known 3,5,6-tripalmitoyl ascorbic acid. These facts show that one of the two ester groups exists in the 6-position and the other in the 2-position of the enediol part and does not exist in the 3-position.

Further, in order to establish the vitamin C activity in a living body of the 2,6-diesters obtained by the present invention, the following experiment was made. Guinea-pigs of a weight of about 190 g. each were fed with a vitamin C lacking feed for 1 week so as to be in a state lacking vitamin C. Each group consisted of 6 guinea-pigs. Then a feed containing 1 mg. of ascorbic acid was fed to the first group and a feed containing 3.51 mg. of ascorbic acid 2,6-dipalmitate (equivalent to 1 mg. of ascorbic acid) was fed to the second group every day for 26 days. The weight of each guinea-pig was measured every two days. As a result, the average weight increase per day was 2.5 g. in the first group and 3 g. in the second group. It was confirmed by these results that the 2,6-diesters obtained by the present invention have the same vitamin C activity as ordinary vitamin C in a living body.

Due to its peculiar chemical structure, the diesters obtained by the process of the present invention show chemical properties which are not attained with known conventional 6-monoesters, specifically a very high stability against oxidation and heat. Therefore, the diesters obtained by the present invention can be formulated into foods, medicines, and cosmetics without any special precautions or trouble.

Thus, the invention provides a vitamin C source having markedly superior stability as compared with prior art products and this source can be incorporated in foods, medicines and cosmetics. Further, due to their chemical structures, the higher fatty acid 2,6-diesters of ascorbic acid or isoascorbic acid show surface active properties. Therefore, by using the higher fatty acid 2,6-diesters of ascorbic acid or isoascorbic acid, the characteristics of products as regards such surface phenomena as emulsified and dispersed states, can be remarkably improved.

Additional uses of the 2,6-diester product of the invention include the following:

(1) When it is added to an edible oil, edible solid fat or an emulsified fat, it will be able to be treated without losing its vitamin C potency source at such high temperatures and for such long times as has been heretofore considered impossible. It can therefore provide a stable vitamin C source not only when used cold but also when used hot.

(2) In such processed food products as, for example, baked cakes and other products which are heated or subjected to high temperatures in the course of manufacture or use such as, for example, gums, processed flour and enriched foods, it can provide a vitamin C source having a stability much higher than before.

(3) In producing cosmetics, it can provide a vitamin C source which is very stable not only against heating in manufacture but also against oxidation.

(4) In medicines for internal and external uses, it can provide a vitamin C source having such high stability as has not been attained heretofore. Especially, due to its fat-solubility, when it is externally applied to a human body, the higher fatty acid 2,6-diesters of the invention can be percutaneously absorbed.

(5) Further, as it has the characteristics of a surface active agent in the above described uses, it can readily be formulated not only as a vitamin C source but also for utilizing such characteristics as emulsifiability, solubilizability and wetability. It can be applied, for example, to vitamin C enriched, emulsified edible fats such as shortening, margarine and butter.

(6) In preparing feeds for cattle, it can provide a very stable vitamin C source.

Some examples of the present invention are given in the following. It is to be understood that these examples will be given by way of illustration and not of limitation.

Example 1

5 g. of ascorbic acid were dissolved in 40 ml. of dimethyl formamide. 7 g. of refined pyridine were added to the solution. While the solution was being stirred, 8 g. of benzoyl chloride were dropped into it at 50 degrees C. over a period of 30 minutes. The solution was then continued to be stirred at the same temperature for 6 hours. Then the solvent was distilled off under a reduced pressure. The residue was treated with dilute hydrochloric acid and an insoluble sticky substance was extracted with ethyl acetate.

The extract was washed with water and was then well shaken with 5 percent aqueous sodium bicarbonate. A light yellow oily substance deposited when the alkaline aqueous extract was acidified by hydrochloric acid, and it was again extracted with ethyl acetate. The extract was washed with water, dried, and then concentrated. A proper amount of petroleum ether was added to it. When the solution was left to stand, 4.3 g. of colorless scale-shaped crystals of ascorbic acid 2,6-dibenzoate having a melting point of 152 to 153.5 degrees C. were obtained.

Analysis as $C_{20}H_{16}O_8$—Calculated values: 62.50% C; 4.16% H. Experimental values: 62.40% C; 4.31% H.

Example 2

5.3 g. of ascorbic acid were dissolved in 35 g. of N-formyl morpholine. 8.3 g. of pyridine were added to the solution. While the solution was being stirred at 30 to 35 degrees C., 12.3 g. of palmitic acid chloride were dropped into it over a period of about 1 hour. After standing overnight, 40 cc. of methanol were added to the solution and the mixture was warmed so as to become homogeneous. The crystals deposited when the solution was left to cool were filtered and dried. By recrystallization from ethyl acetate, 8.1 g. of colorless crystals of ascorbic acid 2,6-dipalmitate having a melting point of 114 to 115 degrees C. were obtained.

Analysis as $C_{38}H_{68}O_8$—Calculated values: 69.89% C; 10.49% H. Experimental values: 69.85% C; 10.57% H.

Example 3

5.3 g. of ascorbic acid were dissolved in 35 g. of N-formyl piperidine. 8.3 g. of pyridine were added to the solution. While the solution was being stirred at 30 to 35 degrees C., 12.3 g. of palmitic acid chloride were dropped into it over a period of about 1 hour. The solution was then left to stand overnight. The solvent was distilled off under a reduced pressure. The crystals deposited when 40 cc. of methanol were added to the residue, were filtered and dried. By recrystallization from ethyl acetate, 5.2 g. of colorless crystals of ascorbic acid 2,6-dipalmitate having a melting point of 114 to 115 degrees C. were obtained. The product was identical with the product synthesized in Example 2.

Example 4

7 g. of palmitic acid chloride were made to react on a mixed solution of 3 g. of ascorbic acid, 21 g. of dimethyl acetamide and 4.7 g. of pyridine at 25 to 30 degrees C. in the same manner as in Example 3. 30 cc. of methanol were added to the residue after the solvent was distilled off. When the deposited crystals were recrystallized from ethyl acetate, 4 g. of ascorbic acid 2,6-dipalmitate of a melting point of 114 to 115 degrees C. were obtained. When dimethyl formamide was used in place of the dimethyl acetamide in this example, exactly the same result was obtained.

Example 5

0.2 g. of ascorbic acid 6-palmitate was dissolved in 2 g. of dimethyl formamide. 0.1 g. of pyridine was added to the solution. 0.14 g. of palmitic acid chloride was dropped into the solution at room temperature. The solution was shaken for a little while, then left to stand overnight, and poured into diluted hydrochloric acid while stirring. The colorless crystalline precipitate was filtered, washed with water and dried. When it was recrystallized from ethyl acetate, 0.15 g. of colorless crystals of ascorbic acid 2,6-dipalmitate having a melting point of 114 to 116 degrees C. was obtained. This product was identical with the product made in Example 2.

Example 6

3 g. of palmitic acid chloride were dropped into a mixed solution of 4.1 g. of isoascorbic acid 6-palmitate, 40 g. of dimethyl formamide and 2.4 g. of pyridine under stirring at 20 to 27 degrees C. over 40 minutes.

The solution was stirred for 1 hour and then left to stand overnight. The solvent was distilled off. 40 cc. of methanol were added to the residue. When the deposited crystals were recrystallized from ethyl acetate, 3.9 g. of isoascorbic acid 2,6-dipalmitate having a melting point of 84 to 85 degrees C. were obtained.

Analysis as $C_{38}H_{68}O_8$—Calculated values: 69.89% C; 10.49% H. Experimental values: 69.73% C; 9.98% H.

Example 7

16.5 g. of palmitic acid chloride were dropped into a mixed solution of 7 g. of isoascorbic acid, 50 g. of dimethyl formamide and 11 g. of pyridine under stirring at 25 to 34 degrees C. over 50 minutes. The solution was stirred at the same temperature for 1 hour and left to stand overnight. The solvent was distilled off. 50 cc. of methanol were added to the residue. The deposited crystals were filtered and recrystallized from ethyl acetate. 10.8 g. of isoascorbic acid 2,6-diphalmitate having a melting point of 84.5 to 85.5 degrees C. were obtained. This product was identical with the product obtained in Example 6.

Example 8

18.2 g. of stearic acid chloride were dropped into a mixed solution of 7 g. of ascorbic acid, 50 g. of dimethyl formamide and 11 g. of pyridine under stirring at 30 to 35 degrees C. over 65 minutes. The solution was stirred at the same temperature for 1 hour and left to stand overnight. The solvent was distilled off. 50 cc. of methanol were added to the residue. The deposited crystals were filtered and recrystallized from ethyl acetate. 12.5 g. of ascorbic acid 2,6-distearate having a melting point of 114 to 115 degrees C. were obtained.

Analysis as $C_{42}H_{76}O_8$—Calculated values: 71.14% C; 10.80% H. Experimental values: 70.51% C; 10.55% H.

Example 9

13.1 g. of lauric acid chloride were dropped into a mixed solution of 7 g. of ascorbic acid, 50 g. of dimethyl formamide and 11 g. of pyridine under stirring at 20 to 30 degrees C. over about 1 hour. The solution was then treated and refined exactly in the same manner as in Example 8. Thus 6.3 g. of ascorbic acid 2,6-dilaurate having a melting point of 115 to 116 degrees C. were obtained.

Analysis as $C_{30}H_{52}O_8$—Calculated values: 66.64% C; 9.69% H. Experimental values: 66.68% C; 9.67% H.

*Example 10*

9.8 g. of n-octanoic acid chloride were dropped into a mixed solution of 7 g. of ascorbic acid, 50 g. of dimethyl formamide and 11 g. of pyridine under stirring at 24 to 38 degrees C. over 1 hour. The solution was further stirred for 1 hour and then left to stand overnight. The solvent was then distilled off under a reduced pressure. When water was added to the residue, an oily substance was first deposited and then it crystallized on cooling. The crystals were filtered, dried and recrystallized from ethyl acetate. Thus 6.9 g. of ascorbic acid 2,6-dioctanoate having a melting point of 112 to 113 degrees C. were obtained.

Analysis as $C_{22}H_{36}O_8$—Calculated values: 61.66% C; 8.47% H. Experimental values: 61.60% C; 8.51% H.

*Example 11*

6.4 g. of n-butyric acid chloride were dropped into a mixed solution of 7 g. of ascorbic acid, 50 g. of dimethyl formamide and 11 g. of pyridine under stirring at 25 to 30 degrees C. over 55 minutes. The solution was further stirred for 1 hour and then left to stand overnight. The solvent was distilled off under a reduced pressure. The residue was treated with diluted hydrochloric acid. The thus deposited oily substance was extracted with ether. The extract was well washed with water and then extracted with 5 percent aqueous sodium bicarbonate. The water layer was acidified with diluted hydrchloric acid. The thus deposited oily substance was again extracted with ether, washed with water, and dried. When the solvent was then distilled off, 6 g. of ascorbic acid 2,6-dibutylate were obtained as a slightly yellow oily substance.

What is claimed is:

1. A process for preparing 2,6-diesters of ascorbic acid or isoascorbic acid in which a member selected from the group consisting of ascorbic acid, isoascorbic acid and their 6-monoesters is reacted with an organic acid halide in the presence of a basic acid binding agent and using as a solvent an N,N-di-substituted amide represented by the general formula

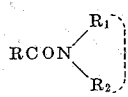

wherein R is a member of the group consisting of a hydrogen atom and lower alkyl radicals and $R_1$ and $R_2$ are members of the group consisting of lower alkyl radicals, piperidyl, pyrrolidyl and morpholyl radicals together with N.

2. A process for preparing 2,6-diesters of ascorbic acid or isoascorbic acid as described in claim 1, in which the solvent is a member selected from the group consisting of N,N-dimethyl acetamide;
N,N-dimethyl formamide;
N-formyl morpholine;
N-formyl pyrrolidine, and
N-formyl piperidine.

3. A process for preparing 2,6-diesters of ascorbic acid or isoascorbic acid as described in claim 1 in which pyridine is used as the basic acid binding agent.

4. A process for preparing 2,6-diesters of ascorbic acid or isoascorbic acid as described in claim 2 in which pyridine is used as the basic acid binding agent.

5. A process for preparing 2,6-diesters of ascorbic acid or isoascorbic acid as described in claim 1 in which the organic acid halide is benzoyl chloride.

6. A process for preparing 2,6-diesters of ascorbic acid or isoascorbic acid as described in claim 1 in which the organic acid halide is a chloride of an aliphatic carboxylic acid having from 4 to 18 carbon atoms.

7. A process for preparing 2,6-diesters of ascorbic acid or isoascorbic acid according to claim 1 in which the reaction is carried out by dissolving a member selected from the group of ascorbic acid and isoascorbic acid in the said N,N-disubstituted amide, the weight of the N,N-disubstituted amide being 5 to 10 times the weight of ascorbic acid or isoascorbic acid, then adding 1.1 to 4 mols of the basic acid binding agent to the mixture, then adding gradually from 1 to 2.2 mols of the organic acid halide to the mixture while the mixture is maintained under stirring at a temperature of from 20 to 50 degrees C., the mixture being further kept at said temperature or left standing at room temperature until the reaction is completed.

8. A process for preparing 2,6-diesters of ascorbic acid or isoascorbic acid according to claim 1 in which the reaction is carried out by dissolving a member selected from the group of 6-monoesters of ascorbic acid and isoascorbic acid in the said N,N-disubstituted amide, the weight of the N,N-disubstituted amide being 5 to 10 times the weight of 6-monoester of ascorbic acid or isoascorbic acid, then adding 1.1 to 4 mols of the basic acid binding agent to the mixture, then adding gradually from 0.5–1.1 mols of the organic acid halide to the mixture while the mixture is maintained under stirring at a temperature of from 20 to 50 degrees C., the mixture being further kept at said temperature or left standing at the room temperature until the reaction is completed.

9. 2,6-diester of ascorbic acid represented by the general formula

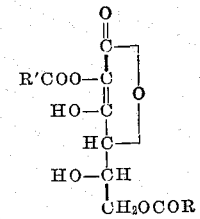

wherein R, R' are members of the group consisting of alkyl having from 3 to 17 carbon atoms and phenyl.

10. 2,6-diester of isoascorbic acid represented by the general formula

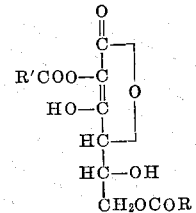

wherein R, R' are members of the group consisting of alkyl having from 3 to 17 carbon atoms and phenyl.

References Cited by the Examiner

UNITED STATES PATENTS 2,150,140   3/1939   Warnat _____ 260—343.7
2,980,702   4/1961   Thesing et al. _____ 260—343.7

OTHER REFERENCES

Merck Index, 7th ed., page 371.

ALEX MAZEL, *Primary Examiner.*

JOSEPH A. NARCAVAGE, *Assistant Examiner.*